(No Model.)
C. ELLIOT.
MEANS FOR PURIFYING WATER FOR BOILERS.
No. 317,983. Patented May 19, 1885.
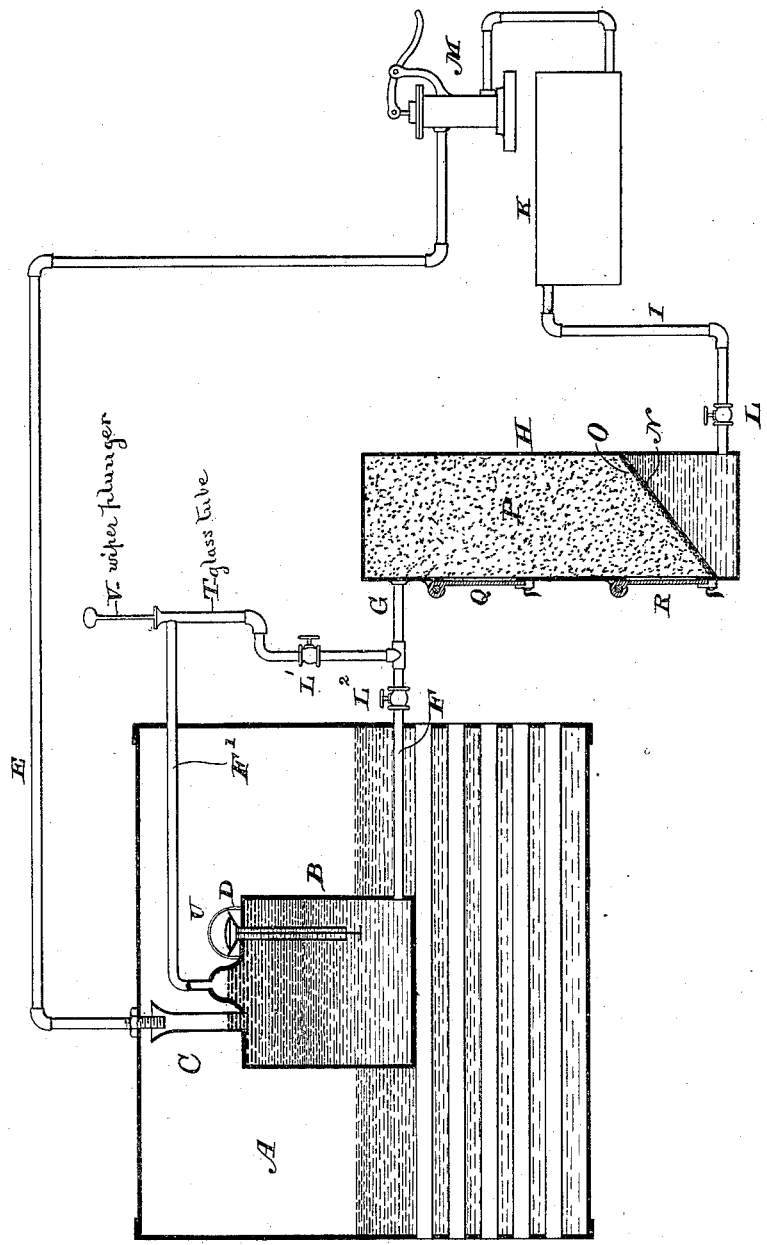
WITNESSES
Wm. A. Skinkle
Geo. W. Young
INVENTOR
Charles Elliot
By his Attorney
Woodbury Lowery

UNITED STATES PATENT OFFICE.

CHARLES ELLIOT, OF SAN FRANCISCO, CALIFORNIA.

MEANS FOR PURIFYING WATER FOR BOILERS.

SPECIFICATION forming part of Letters Patent No. 317,983, dated May 19, 1885.

Application filed April 19, 1883. (No model.)

*To all whom it may concern:*

Be it known that I, CHARLES ELLIOT, a citizen of the United States of America, residing at San Francisco, in the county of San Francisco and State of California, have invented certain new and useful Improvements in Means for Purifying Water for Boilers, of which the following is a specification, reference being had therein to the accompanying drawings.

My invention relates more particularly to marine boilers, where the same water is successively condensed and used a great many times, and where, owing to the presence of oil and tallow, some of these lubricants find their way into the water used in the boiler and thus into the boiler itself, which they soon clog and eat away.

My invention is intended to collect the oil, tallow and other impurities in a separate compartment within the boiler, to conduct them thence through suitable purifying apparatus, in which the oil, tallow, and other impurities are removed, and then to return the water purified and ready for use to the boiler, and this with the least possible expenditure of the water within the boiler. To this end I employ within the boiler a closed settler, such as that patented to me in Letters Patent of the United States No. 271,821, granted February 6, 1883, which I provide with two blow-offs, an upper one for the oil and tallow and the bottom one for solid matter, both connected with a suitable filtering apparatus, from whence a pipe passes to the condenser.

In the accompanying drawings, which illustrate my invention, Figure 1 is a view, partly in section, of the boiler, settler, filter, condenser, their connecting-pipes, and the feed or force pump and feed pipe.

A is the boiler. B is a closed settler, such as that described in my patent already referred to. C is the drip-funnel; D, the overflow, and E a supply or feed pipe. F is the bottom, and F' the upper, blow-off, which are connected by the tube G to the filter H, outside the boiler. I is a pipe leading from the bottom of the filter into the condenser K. L L' L'' are stop-cocks and M is the force or feed pump; T, glass tube; V, orifice of glass tube.

The filter H consists of a suitable vessel divided into an upper and a lower compartment by the grating N. A brass-wire cloth, O, rests upon the grating N, the perforations of which are fine enough to arrest the passage of any particles of the charcoal P with which the upper compartment of the filter-vessel is filled.

Q and R are doors through which the charcoal is introduced into and removed from the filter.

The operation of the apparatus is as follows: The oil, tallow, and other impurities are collected in the settler within the boiler in the manner described in my prior patent. The oil and tallow floating on the surface of the water in the settler will be above the opening of the overflow and cannot escape into the boiler. Prior to blowing off, I create a vacuum in the filter-chamber by opening the cock between it and the condenser. I then remove the oil by opening the upper blow-off, F', after closing the cock L. The oil, with a very small percentage of water, is blown into the filter, where it is left until cool enough to rise to the top, when it is absorbed by the charcoal. Then the vacuum is again created, and the clear water, which has settled at the bottom of the filter, is pumped back into the boiler. For the solid impurities substantially the same operation is repeated with the bottom blow-off, through which the oil may also be removed, if desired.

In constructing my settler for use in marine boilers, I prefer to make it quite deep and narrow, as shown in the drawings, and I bring the inner opening of the overflow very near the bottom. I place the guide to the check-valve over the top of the overflow, which prevents clogging, and I deliver the water from the feed-pipe E in a solid stream. I also find it advantageous to somewhat lessen the flare of the drip-funnel C, and I place a small bulb, U, on top the settler, from which the upper blow-off, F', leads, and in which the melted oil and tallow collect, so that they may be drawn off without removing any water with them. The height to which the liquid will rise in the body of the settler is regulated by the depth to which the lower opening of the drip-funnel extends into the settler, so that by shortening this internal depth the lighter liquids floating on the surface of the water can be caused to occupy the interior of the bulb.

I give the filter twice the capacity of the settler, so that there will be room for a full charge to be left in when the old one is pumped out. When the charcoal in the filter has become so clogged with oil, tallow, and other impurities as to be no longer available, it is removed from the filter through the lower door, R, and burned under the boiler.

A glass tube is placed in the upper blow-off outside the boiler and is provided with the wiper-plunger to clear the tube in order that the engineer may see the liquid drawn off into the filter.

It is obvious that the oil may be drawn off into a separate receiver so as not to contaminate the charcoal of the filter, and the separation of the water and oil may take place in this second receiver, which may be connected through the condenser to the feed-pipe in precisely the same manner as is the single filter-receiver shown in the drawings.

With the apparatus which I have described and this method of using it, I secure the very obvious advantage of removing the liquid and solid impurities with the expulsion of the least possible amount of water, as about one per cent. only of the water used in the boiler is blown off, and this is recovered by passing through the vacuum-chamber, whereas in all systems known to me the whole mass of the water used in the boiler is caused to pass through a filter and to circulate from the bottom to the top of the boiler. This circulation I obviate by removing and filtering only the water necessary to carry the impurities. In this there is an economy of heat, as the water in the boiler is left undisturbed; while by means of the two blow-offs the oil may be removed, leaving the body of water in the settler undisturbed.

I do not limit myself to the form of settler shown in my drawings, as any settler which will collect the impurities present in the water and allow of their being blown off in the manner described will answer my purpose, although I prefer the form which I have shown. Neither do I limit myself to the particular form of filter shown, as any filter which will arrest the passage of the impurities and allow that of the water and steam will come within the scope of my invention.

Having thus described my invention, what I claim as new, and desire to secure by Letters Patent, is—

1. The combination of a closed settler for purifying water for boilers having a lower blow-off and an upper blow-off, substantially as and for the purpose described.

2. The combination of a closed settler within a boiler having a lower blow-off and an upper blow-off, a feed-pipe, and a filter connected with the upper and lower blow-offs, substantially as and for the purpose described.

3. The combination of a settler within a boiler, a blow-off connecting the settler with the condenser of the boiler, a filter interposed between the settler and condenser, through which the blow-off passes, and a feed-pipe, substantially as hereinbefore set forth.

4. The combination of a settler within a boiler, a blow-off, a filter connected therewith, means for producing a vacuum in the filter, and a feed-pipe, substantially as hereinbefore set forth.

5. The combination of a settler within a boiler, a blow-off, a filter connected therewith, means for producing a vacuum within the filter, and means for returning the clear water collected in the filter to the boiler, substantially as hereinbefore set forth.

6. The combination, with the blow-off of a settler, of a glass tube and wiper-plunger, substantially as and for the purpose hereinbefore set forth.

In testimony whereof I have affixed my signature, in presence of two witnesses, this 5th day of April, 1883.

CHARLES ELLIOT.

Witnesses:
M. H. EWITT,
HENRY EICKHOFF.